As shown in FIG. 27 one end portion of the member 3 has a threaded portion 53 on to which is screwed a thrust member 54 biassed by a spring 55, which bears against the collar 2 or body 7 of the connector.

The couplings described enable connections to be effected between sockets and tubes in miniaturised pneumatic control systems without the need to specially prepare the tube for the connection. The couplings are relatively simple, inexpensive to produce, and have relatively small radial dimensions, which are advantageous in relatively complex circuits, in which it is desirable to be able to make connections very close together.

What is claimed is:

1. A releasable coupling for a fluid-carrying tube, said coupling comprising means defining first, second, third, and fourth stepped concentric bores, a collar retained in said first bore and having an inner surface inclined to the axis of said bore, a clamping member mounted within said collar for axial movement relative thereto and having a bore slightly larger than the diameter of the tube, said clamping member comprising a plurality of flexible jaws and means on said jaws co-operating with the said inclined surface to drive said jaws inwardly upon relative movement between said collar and said jaws to clamp said tube, and a packing ring retained in said second bore to provide a seal between the outer surface of the tube and the wall of said second bore, said third and fourth bores serving to locate said tube.

2. A coupling according to claim 1 wherein the outer surface of said collar comprises a first cylindrical portion for guiding said collar into said first bore, a second cylindrical portion behind said first cylindrical portion and having a diameter larger than the diameter of said first cylindrical portion and being a force fit within said first bore, and a sharp projection, behind said second cylindrical portion co-operating with the wall of said first bore.

3. A coupling according to claim 1 further comprising a rim provided around the entrance to said first bore, said rim being upset to retain said collar in said first bore.

4. A coupling according to claim 1 wherein the clamping member comprises moulded plastic covered with a layer of a harder material.

5. A coupling according to claim 1 wherein the clamping member comprises a spring-steel sleeve having a covering of moulded plastic, an end portion of said sleeve extending from said covering to provide a sharp edge arranged to engage the tube.

6. A coupling according to claim 5 wherein the clamping member comprises an outer surface inclined to the axis of said bores and arranged for contact by the packing ring.

7. A coupling according to claim 1 wherein the clamping member comprises an outer surface inclined to the axis of said bores, said coupling further comprising a freely movable ring member having a conical surface arranged to contact the said inclined surface of the clamping member, said ring member being interposed between said clamping member and said packing ring.

8. A coupling according to claim 1 wherein said clamping member comprises a plurality of slots, said coupling further comprising a split ring fitted around the clamping member, said split ring having a plurality of arms each engaged within a respective one of said slots, and said arms including tongues which extend longitudinally over said clamping member.

9. A coupling according to claim 1 further comprising abutment means slidable axially relative to said bores, said abutment means being arranged for abutting engagement with said clamping member, and stop means for limiting axial movement of said abutment means relative to said bores.

10. A releasable coupling according to claim 1 further comprising resilient means biassing said clamping member axially relative to said collar in a direction to drive said flexible jaws inwardly.

* * * * *

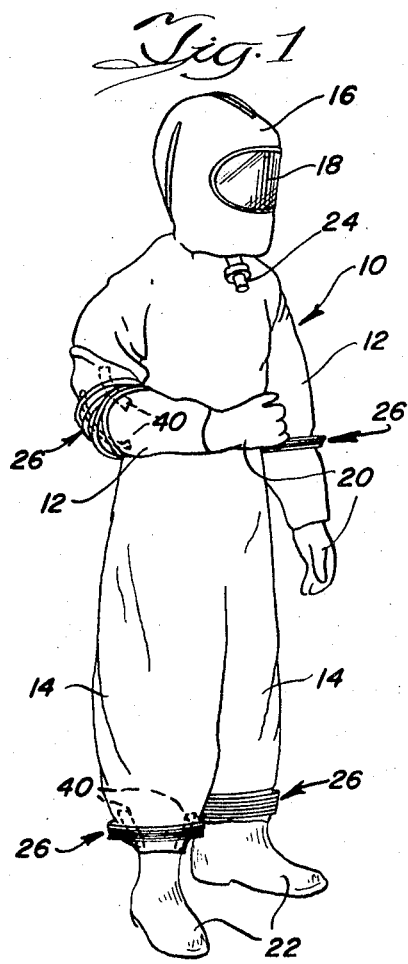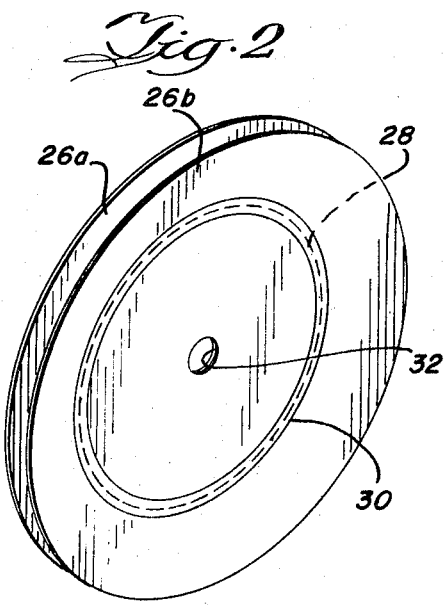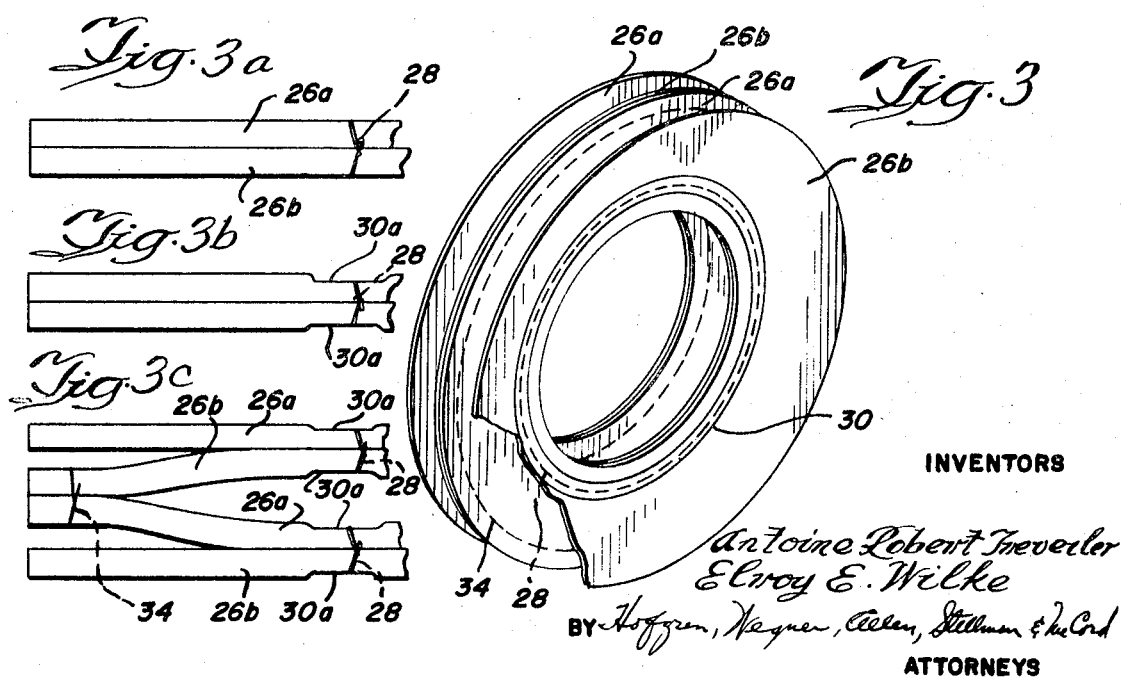

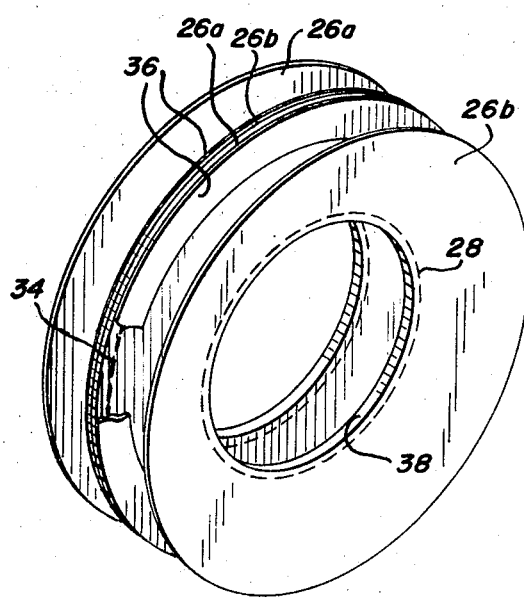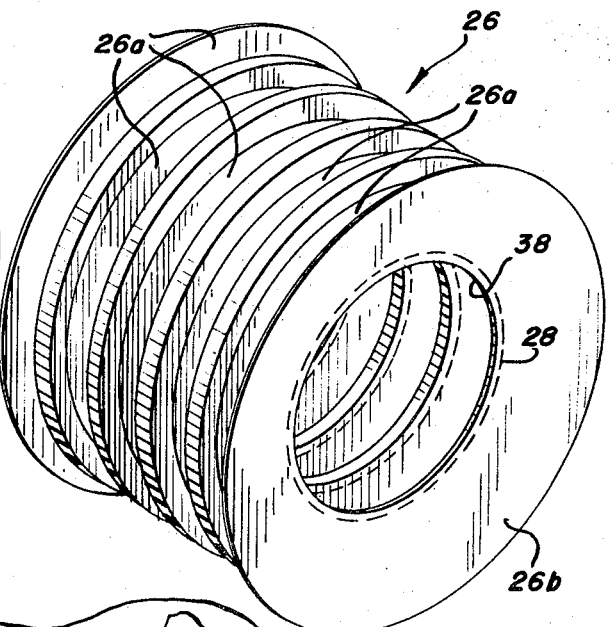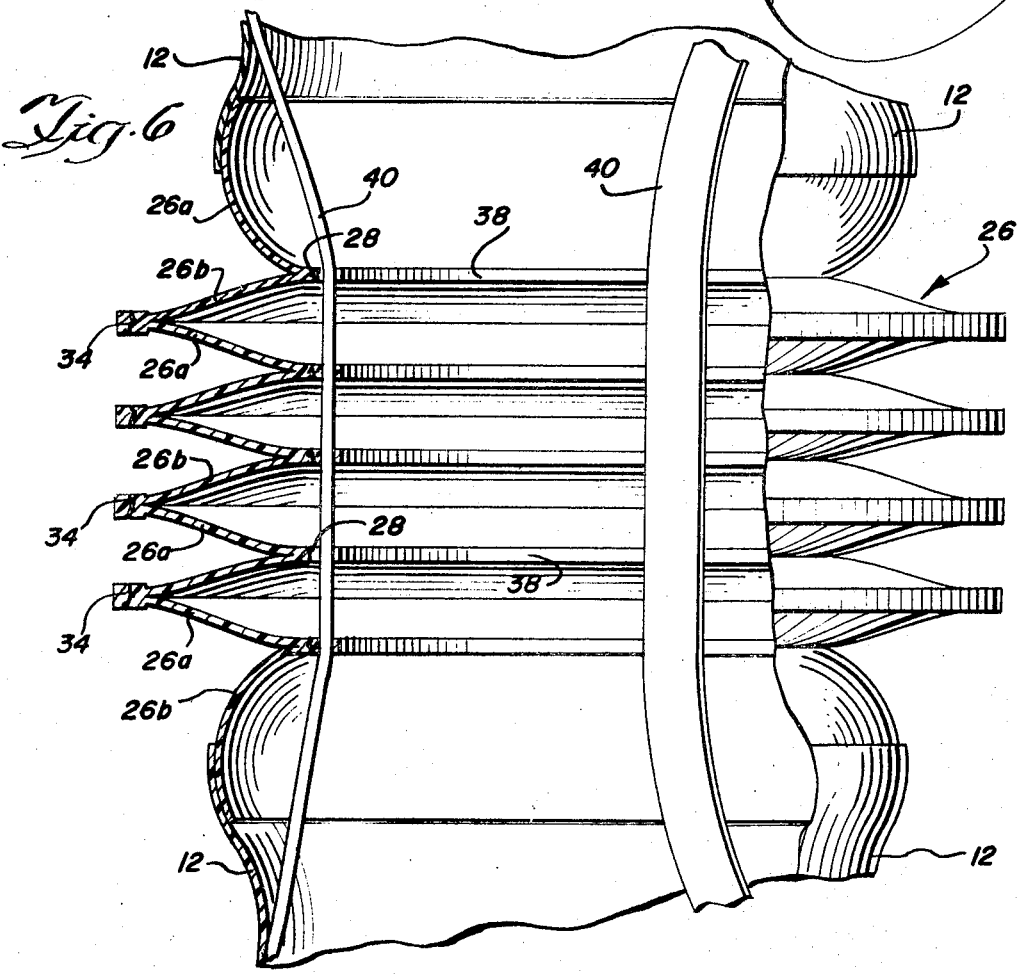

3,653,690

SAFETY GARMENT JOINT AND METHOD OF MAKING SAME

BACKGROUND AND SUMMARY OF THE INVENTION

This invention relates to a gas and liquid impervious safety garment, and more particularly to a pleated expansible portion of the garment which surrounds a portion of a person's body, such as an arm or leg.

It is of considerable importance in many manufacturing facilities, or the like, to provide emergency equipment which is used in the event of a valve failure, pipeline break, or similar occurrence, which permits the escape of dangerous and sometimes deadly gases and/or liquids. The need for emergency protective garments for workmen is particularly present in chemical plants, refineries, or the like. Important items of emergency equipment are safety garments worm by men skilled in meeting such emergencies to protect their bodies while working in a dangerous environment. One garment used extensively at the present time is a safety suit which completely encloses a person's body and is fabricated of gas and liquid impervious material, usually a plastic material or impregnated fabric. Safety gloves and boots may be hermetically sealed to the sleeves and trouser legs of the suit; a window may be provided in a helmet portion of the suit; and built-in oxygen or ventilation systems may be employed.

Since such emergencies may arise at any time, it is desirous to provide a safety suit which is adjustable in size because the suit may be required to fit any number of different workmen who might be assigned to the emergency job at any particular time. In the past, such suits normally have been made adjustable by providing sleeves and trouser legs sufficiently long to accommodate the worker of largest size, and providing the suit with adjusting "take up straps" on the inside of the sleeves and trouser legs to gather or blouse the sleeves and legs so that the suit will fit different and smaller sized workmen. Such adjusting straps have several disadvantages. For instance, the gathers or folds formed thereby result in an extremely clumsy garment which may interfere with a person's mobility. Furthermore, adjustment of the take up straps for the sleeves and trouser legs of the garment require time which in many instances would be taken away from the emergency itself.

In addition, adjustment of the straps usually required particularly skilled assistance for the workman to insure that the "take up" was enough but not excessive, because once adjusted the appendage covering could not be relaxed to expand beyond the set limits without aid of another person.

An object, therefore, of the present invention is to provide a new and improved gas and liquid impervious safety garment, and more particularly, an improved pleated expansible portion of such a garment which itself is gas and liquid impervious, which is self-adjusting, and which provides a neat streamlined accordion type portion of the suit which does not interfere with the movement of one wearing the garment.

Another object is to provide a safety garment with an improved take-up and expansion portion that automatically extends and retracts responsive to stress placed upon the portion by the movements of the workman wearing the garment.

A further object is to provide a method of fabricating a bellows-like, pleated expansible portion of a gas and liquid impervious safety garment, of the character described.

In the embodiment of the invention shown herein, the expansible portion of the safety garment is of the accordion type with alternating inner and outer seams spaced in a direction generally perpendicular to the adjoining portions of the garment, such as a sleeve or trouser leg. The method comprises the steps of providing a plurality of pairs of generally disc shaped flat sections of relatively thin plastic material and generally of a uniform size. The two sections of each pair are placed in juxtaposition and joined by sewing a first continuous circular line of stitching about a central aperture locating position spaced inwardly of the periphery of the two sections. The two sections of each pair thereof then are heat sealed together along the first line of stitching, with the seal extending slightly outwardly from the stitching toward the periphery of the sections, to form the inner seams of the accordion portion of the suit. The pairs of joined and sealed sections then are placed in juxtaposition and adjacent sections of adjacent pairs thereof are joined by sewing a second continuous line of stitching spaced outwardly of the first line, and a heat seal is formed along the second line of stitching to form the outer seams of the accordion portion of the suit. A generally central aperture then is cut out of the joined and sealed pairs of sections of flat plastic material, and the accordion suit portion formed thereby is joined in the garment, as in the sleeves or the trouser legs thereof, by hermetically sealed seams or joints. One or more elastic bands then are secured to the adjacent portions of the sleeves or trouser legs of the garment, on the inside thereof, spanning the pleated expansible portion through the central aperture thereof, to draw the accordion sections together but to permit the sections to expand or self adjust to fit different sized persons. All seams sewn are armoured with impervious material so as to present no avenue for ingress of liquid or gas to the interior of the suit.

In the preferred embodiment of the invention, the outer seams of the accordion expansible portion described in the preceding paragraph is reinforced or armoured during the heat sealing operation thereof. This is done by positioning a reinforcing strip of thin plastic material over the outside of each of the joined sections and overlying the outer lines of stitching. The strips and the joined sections then are heat sealed together over the outer lines of stitching to provide a gas and liquid impervious seam. The heat sealing preferably should extend slightly outwardly beyond both the inner and outer lines of stitching so that there are not threads exposed on the outside of the garment, to insure a hermetic seal.

Other objects, features and advantages of the invention will become apparent from the following detailed description taken in connection with the accompanying drawings.

DETAILED DESCRIPTION OF THE DRAWINGS

FIG. 1 is a perspective view of a safety garment embodying expansible portions in the sleeves and trouser legs thereof, made in accordance with the concepts of the present invention;

FIG. 2 is a perspective view of a pair of flat sections of the relatively thin plastic material sewn together to illustrate one of the first steps in fabricating the expansible garment portions;

FIG. 3 is a perspective view, partially cut away, showing two pairs of sections, as shown in FIG. 2, sewn together to illustrate a subsequent step in fabricating the expansible portions;

FIGS. 3a through 3c are schematic views illustrating the sequence of steps shown in FIGS. 2 and 3;

FIG. 4 is a perspective view, partially cut away, illustrating a further step in fabricating the expansible portions, wherein the outer seams thereof are reinforced or armoured for subsequent heat sealing;

FIG. 5 is a perspective view of a completed expansible portion of the safety garment, embodying five pairs of plastic sections, before the expansible portion is joined in the garment; and FIG. 6 is a partial section of the expansible portion shown in FIG. 5 joined in either a sleeve or trouser leg of the safety garment, and illustrating a pair of the gathering elastic bands spanning the inside of the expansible portion.

DETAILED DESCRIPTION OF THE INVENTION

The invention is shown herein as embodied in a gas and liquid impervious safety garment, generally designated 10 in FIG. 1, which, in most instances, completely covers a person's body and includes sleeve portions 12, trouser portions 14, and a helmet portion 16 with a window 18 hermetically sealed in the front thereof. Safety gloves 20 and boots 22 preferably are hermetically sealed on the ends of the sleeves and trouser legs, respectively. An outlet conduit 24 may be provided below the helmet 16 for connection to breathing and/or ventilating systems.

The invention disclosed herein is directed particularly to providing bellows-like, pleated expansible portions, generally designated 26 in FIG. 1, joined in the safety garment, for instance in the sleeves 12 and/or trouser legs 14. The expansible portions 26, as will be shown hereinafter, are of the accordion type, having alternating inner and outer seams spaced in a direction generally perpendicular to the adjoining portions of the garment such as the sleeves and the trouser legs. It should be pointed out that the expansible portions 26 are shown herein to be circular or tubular in shape for use in sleeves or trouser legs of the safety garment. However, the principles of the invention are equally applicable to semi-circular expansible portions, or other shapes applicable to other portions of the safety garment.

The invention relates both to a product comprising the expansible sections 26, as well as a method of fabricating the expansible portions. The fabrication method will be described in detail below. The structure of the expansible sections will be readily apparent in every detail from the following explanation of the method of fabrication.

Initially, it should be pointed out that the expansible portions 26 are fabricated by starting out with a plurality of preferably disc shaped flat sections of relatively thin plastic or impregnated fabric material of a generally uniform size, the material being capable of adherance by heat sealing to provide gas and liquid impervious seams for the accordion type expansible portions of the garment, and to permit a completed expansible garment portion to be hermetically sealed in a sleeve or trousers leg, for instance, of the safety garment.

Referring to FIG. 2, a pair of the aforesaid flat sections of plastic material, sections 26a and 26b, are placed in juxtaposition and joined together by sewing a first continuous circular line of stitching 28 about a central aperture locating position (to be described hereinafter), and spaced inwardly of the periphery of the pairs of sections. At least one of the sections, 26b shown in FIG. 2, may be provided with a circular impression 30 which serves as a guide for sewing the line of stitching 28. In addition, air passages 32 should be formed in the flat sections 26a, 26b, within the bounds of the circular line of stitching 28, before or after joining the two sections to provide means to relieve vacuum between the sections and between adjacent pairs of sections during subsequent fabricating steps, as will be readily apparent hereinafter.

After joining the two sections 26a, 26b by sewing the circular line of stitching 28, the two sections are heat sealed together along the line stitching, with the heat seal extending outwardly at least slightly beyond the stitching, preferably generally in the area shown by the aforesaid impression 30 (FIG. 2). Actually, the same heating machine could be utilized to form the guiding impression 30 as well as provide the heat seal.

At this point, it should be pointed out that a plurality of pairs of sections 26a, 26b are sewn together and heat sealed as described above and then the pairs of joined and sealed sections are themselves joined in juxtaposition, as described below, to form the bellows or accordion type expansible section 26.

More particularly, as shown in FIG. 3, two pairs of joined and sealed sections 26a, 26b are placed in juxtaposition and adjacent sections (i.e., section 26a of one pair and section 26b of the other pair) of the two adjacent pairs thereof are joined by sewing a second circular continuous line of stitching 34 spaced outwardly from the first line of stitching 28.

The sequence of fabricating steps described up to this point are shown in FIGS. 3a through 3c. FIG. 3a shows a pair of sections 26a, 26b sewn together by a line of stitching 28. FIG. 3b shows the joined pair of sections heat sealed together along the line of stitching 28 and extending outwardly therefrom, as designated by the impressions 30a which usually are left by the sealing iron. FIG. 3c shows the next step of sewing adjacent sections of adjacent pairs thereof together by the line of stitching 34. The second or outer line of stitching 34 preferably is maintained generally equidistant from the first or inner line of stitching 28.

After sewing the two adjacent pairs of sections 28a, 28b together along stitching line 34, a reinforced or armoured heat seal is provided over the stitching line. Referring to FIG. 4, this is accomplished by positioning reinforcing strips 36 over the line of stitching 34 on the outside face of each of the joined sections 26a, 26b about the periphery thereof and overlying the stitching line 34, as best seen in FIG. 4. The strips 36 and the sections 26a, 26b sandwiched therebetween then are heat sealed together over the stitching line 34 with the seal extending at least slightly outwardly from the stitching toward the periphery of the sections to provide a gas and liquid impervious seam. Any excess portions of the strips 36, or the outer periphery of the sections 26a, 26b sandwiched and sealed therebetween, then is trimmed off to provide a neat outer periphery for the outer seams of the expansible portion 26 (see FIG. 5).

A central aperture 38 then is cut out of the joined and sealed sections 26a, 26b through which a body portion such as an arm or leg will extend when the expansible portion is joined in the safety garment.

It should be pointed out that the above description of the fabrication method of this invention is directed to the assembly and fabrication of only two pairs of sections 26a, 26b. This is done for illustration and brevity purposes only. However, the same structure and fabrication procedures may be performed in fabricating expansible portions comprising more than two of such pairs of such sections, for instance five sections as shown in FIGS. 1, 5 and 6.

FIG. 5 shows a completely fabricated expansible portioned 26 embodying the concepts of the present invention prior to joining the expansible portion in a safety garment. FIG. 6 shows the expansible portion 26 shown of FIG. 5 hermetically sealed in a portion of the safety garment, for instance sleeve 12. Section 26a of the top pair (as viewed in FIG. 6) of joined and sealed sections, and section 26b of the lower pair thereof are hermetically sealed to adjacent portions of the sleeve 12, as by heat sealing or the like. FIG. 6 shows that by heat sealing and armouring the seams between adjacent sections and adjacent pairs thereof, in the manner described above, there is no stitching exposed on the exterior of the suit, and a gas and liquid impervious expansible portion of the suit is provided.

Referring to FIGS. 1 and 6, a plurality of elastic bands 40 are secured to the inside of the garment (for instance the sleeve 12 shown in FIG. 6) on opposite sides of the expansible portion 26 and spanning the expansible portion on the inside thereof through the apertures 38 in the sections to normally urge the expansible portion to a contracted condition. Appropriately, the expansible portion 26 may be expanded against the biasing of the elastic bands 40 for self adjustment to fit different sized individuals. It thus is readily apparent that the expansible portions 26 of the present invention, and the garment within which they are built-in, protect a workman while conforming to the workman's size so as to provide maximum mobility commensurate with the total protection against ambient liquid and gas environment.

The foregoing detailed description has been given for clearness of understanding only and no unnecessary limitations should be understood therefrom as some modifications will be obvious to those skilled in the art.

We claim:

1. A method of fabricating a bellows-like, pleated expansible portion of a gas and liquid impervious safety garment, comprising the steps of:

providing a plurality of pairs of flat sections of relatively thin flexible material and generally of a uniform shape;

placing the two sections of each pair thereof in juxtaposition;

joining the two sections of each pair thereof by sewing a first continuous line of stitching about a central aperture locating position and spaced inwardly of the periphery of said sections;

heat sealing the two sections of each pair thereof together along said first line of stitching;

placing at least two pairs of said joined and sealed sections in juxtaposition;

joining adjacent sections of adjacent pairs thereof by sewing a second continuous line of stitching spaced outwardly of said first line of stitching;

heat sealing the adjacent sections of adjacent pairs thereof together along said second line of stitching; and joining said joined and sealed pairs of sections in said garment.

2. The method of claim 1 including the step of forming a body portion receiving aperture through said joined and sealed flat sections inside of said first line of stitching after sewing said first line of stitching and before joining said pairs of joined and sealed sections in said garment.

3. The method of claim 2 including the step of securing at least one elastic strap to the inside of said garment on opposite sides of said expansible portion, the strap extending through said aperture and normally biasing the expansible portion to a contracted condition.

4. The method of claim 1 including the step of forming an air passage in each of said flat sections within the bounds of said first line of stitching before joining said pairs of said sections together to provide means to relieve vacuum between adjacent sections.

5. The method of claim 1 wherein said second line of stitching is sewn generally equidistant from said first line of stitching.

6. The method of claim 1 wherein said step of heat sealing along said second line of stitching is performed by positioning a reinforcing strip of thin flexible material over said second line of stitching on the outside of each of said joined sections, and heat sealing the strips and the sections together over said second line of stitching to provide a gas and liquid impervious seam.

7. The method of claim 6 wherein said strips are positioned so as to extend outwardly of said second line of stitching, and including the step of trimming off any excess of said strips and/or said sections which extends outwardly beyond the heat seal over said second line of stitching.

8. The method of claim 1 including the step of providing an elongated guiding impressing on the outside of at least one section of each pair thereof to guide the sewing of said first line of stitching.

9. The method of claim 1 including the step of trimming off any excess of said sections which extends outwardly beyond the heat seal over said second line of stitching.

10. The method of claim 1 wherein said heat seals over said first and second lines of stitching extend at least slightly outwardly beyond the stitching toward the periphery of the sections to insure gas and liquid impervious seams.

11. A method of fabricating a pleated expansible portion of a gas and liquid impervious safety garment, said portion being of the accordion type with alternating inner and outer seams spaced in a direction generally perpendicular to adjoining portions of the garment, comprising the steps of:

providing a plurality of pairs of flat sections of relatively thin flexible material having at least one surface of plastic material;

joining the two sections of each pair thereof by sewing a first line of stitching and heat sealing the two plastic surfaces of such sections of each pair along said first line of stitching to form said inner seams;

joining adjacent sections of adjacently positioned pairs thereof by sewing second lines of stitching spaced from said first lines of stitching and heat sealing along said second line of stitching to form said outer seams; and joining said joined and sealed pairs of sections in said garment by a gas and liquid impervious seam.

12. The method of claim 11 including the step of trimming off any excess of said sections which extends outwardly beyond the heat seal over said second lines of stitching.

13. The method of claim 11 wherein said step of heat sealing along said second line of stitching is performed by positioning a reinforcing strip of thin plastic material over said second line of stitching on the outside of each of said joined sections, and heating sealing the strips and the sections together over said second line of stitching to provide a gas and liquid impervious seam.

14. The method of claim 13 wherein said strips are positioned so as to extend outwardly of said second line of stitching, and including the step of trimming off any excess of said strips and/or said sections which extends outwardly beyond the heat seal over said second line of stitching.

15. The method of claim 11 including the step of securing at least one elastic strap to the inside of said garment on opposite sides of said expansible portion to urge the expansible portion to a contracted condition.

16. In a gas and liquid impervious safety garment, a pleated expansible portion of the accordion type with alternating inner and outer seams spaced in a direction generally perpendicular to adjoining portions of the garment, said inner and outer seams comprising a line of stitching between adjacent pleated sections, and a heat seal over said lines of stitching and extending at least slightly outwardly therefrom toward the outside of the garment to insure that the seams are hermetically sealed.

17. The safety garment of claim 16 wherein at least the outside seams of said expansible portion are reinforced by strips of plastic-like material positioned over each side of said stitching and heat sealed thereof.

18. The safety garment of claim 16 including at least one elastic strap secured to the inside of the garment spanning said expansible portion to urge the expansible portion to a contracted condition.

* * * * *